United States Patent
Xu

(10) Patent No.: US 10,084,825 B1
(45) Date of Patent: Sep. 25, 2018

(54) REDUCING REDUNDANT OPERATIONS PERFORMED BY MEMBERS OF A COOPERATIVE SECURITY FABRIC

(71) Applicant: Fortinet, Inc., Sunnyvale, CA (US)

(72) Inventor: Xiaodong Xu, Surrey (CA)

(73) Assignee: Fortinet, Inc., Sunnyvale, CA (US)

( * ) Notice: Subject to any disclaimer, the term of this patent is extended or adjusted under 35 U.S.C. 154(b) by 27 days.

(21) Appl. No.: 15/716,925

(22) Filed: Sep. 27, 2017

Related U.S. Application Data

(60) Provisional application No. 62/503,252, filed on May 8, 2017.

(51) Int. Cl.
  *H04L 29/06* (2006.01)
  *H04L 12/24* (2006.01)
  *H04W 24/02* (2009.01)
  *H04W 12/06* (2009.01)
  *H04W 12/08* (2009.01)

(52) U.S. Cl.
  CPC .......... *H04L 63/20* (2013.01); *H04L 41/0873* (2013.01); *H04L 63/1408* (2013.01); *H04W 12/06* (2013.01); *H04W 12/08* (2013.01); *H04W 24/02* (2013.01)

(58) Field of Classification Search
  CPC ..... H04L 63/08; H04L 63/20; H04L 63/1408; H04L 63/0263; H04L 63/0281; H04L 41/0873; H04W 12/06; H04W 12/08; H04W 24/02
  USPC ...................... 726/1, 6, 11–15; 713/160, 162
  See application file for complete search history.

(56) References Cited

U.S. PATENT DOCUMENTS

| | | | |
|---|---|---|---|
| 8,423,758 B2* | 4/2013 | Singhal | H04L 63/1466 713/150 |
| 9,015,823 B2* | 4/2015 | Koponen | H04L 41/0823 726/1 |
| 9,021,574 B1* | 4/2015 | Flowers | H04L 63/0209 713/153 |
| 9,038,178 B1* | 5/2015 | Lin | H04L 63/1416 709/224 |
| 9,043,893 B1* | 5/2015 | Benson | H04L 63/029 726/11 |
| 9,054,990 B2* | 6/2015 | Davis | H04L 45/60 |

* cited by examiner

*Primary Examiner* — Hosuk Song
(74) *Attorney, Agent, or Firm* — Hamilton, DeSanctis & Cha LLP

(57) ABSTRACT

Systems and methods for coordinating security operations among members of a cooperative security fabric (CSF) are provided. According to one embodiment, a first network security appliance of a CSF receives incoming network traffic and determines whether the network traffic has been transmitted from a second network security appliance based on a flag carried by one or more packets of the network traffic. If the incoming network traffic is from the second network security appliance, the first network security appliance determines network security operations that are executed by the second network security appliance and then determines local network security operations. The first network security appliance executes the local network security operations on the network traffic.

31 Claims, 5 Drawing Sheets

REDUCING REDUNDANT OPERATIONS PERFORMED BY MEMBERS OF A COOPERATIVE SECURITY FABRIC

CROSS-REFERENCE TO RELATED PATENTS

This application claims the benefit of priority of U.S. Provisional Application No. 62/503,252, filed on May 8, 2017, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2017, Fortinet, Inc.

BACKGROUND

Field

Embodiments of the present invention generally relate to the field of network security. In particular, various embodiments relate to systems and methods for managing network security operations among cooperative security appliances.

Description of the Related Art

In a large network, many network security appliances may be deployed at different locations within the network. Network traffic transmitted to/from the network may go through multiple network security appliances along a path within the network. Usually, a network security appliance may be configured with multiple policies that define security operations to be executed on the incoming network traffic. The security operations may include network firewalling, virtual private networking (VPN), antivirus, intrusion prevention (IPS), content filtering, data leak prevention, antispam, antispyware, logging, reputation-based protections, event correlation, network access control, vulnerability management, load balancing and traffic shaping. When a network security appliance works independently, the network security appliance may execute its local operations, for example logging, IPS and antivirus scanning, to incoming network traffic and then transmit the network traffic to a next hop network security appliance. The next hop network security appliance may also work independently and execute some operations, such as logging, antivirus scanning. Therefore, operations executed by the next hop network security appliance may be redundant as these operations have already been done by a previous network security appliance at a previous hop. In example above, both network security appliances execute operations to the incoming network traffic based on local policies, the incoming network traffic are logged and scanned twice at these two appliances. The repeating scanning may incur unnecessary delay on the transmission of network traffic and the redundant logging to the same network traffic may waste network resources and introduce complexity to analytics to the network loggings.

Therefore, there is a need for a cooperative security fabric (CSF) that may coordinate operations performed on network traffic to avoid or reduce redundant operations among members of the CSF.

SUMMARY

Systems and methods for coordinating security operations among members of a cooperative security fabric (CSF) are provided. According to one embodiment, a first network security appliance of a CSF receives incoming network traffic and determines whether the network traffic has been transmitted from a second network security appliance based on a flag carried by one or more packets of the network traffic. If the incoming network traffic is from the second network security appliance, the first network security appliance determines network security operations that are executed by the second network security appliance and then determines local network security operations. The first network security appliance executes the local network security operations on the network traffic.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
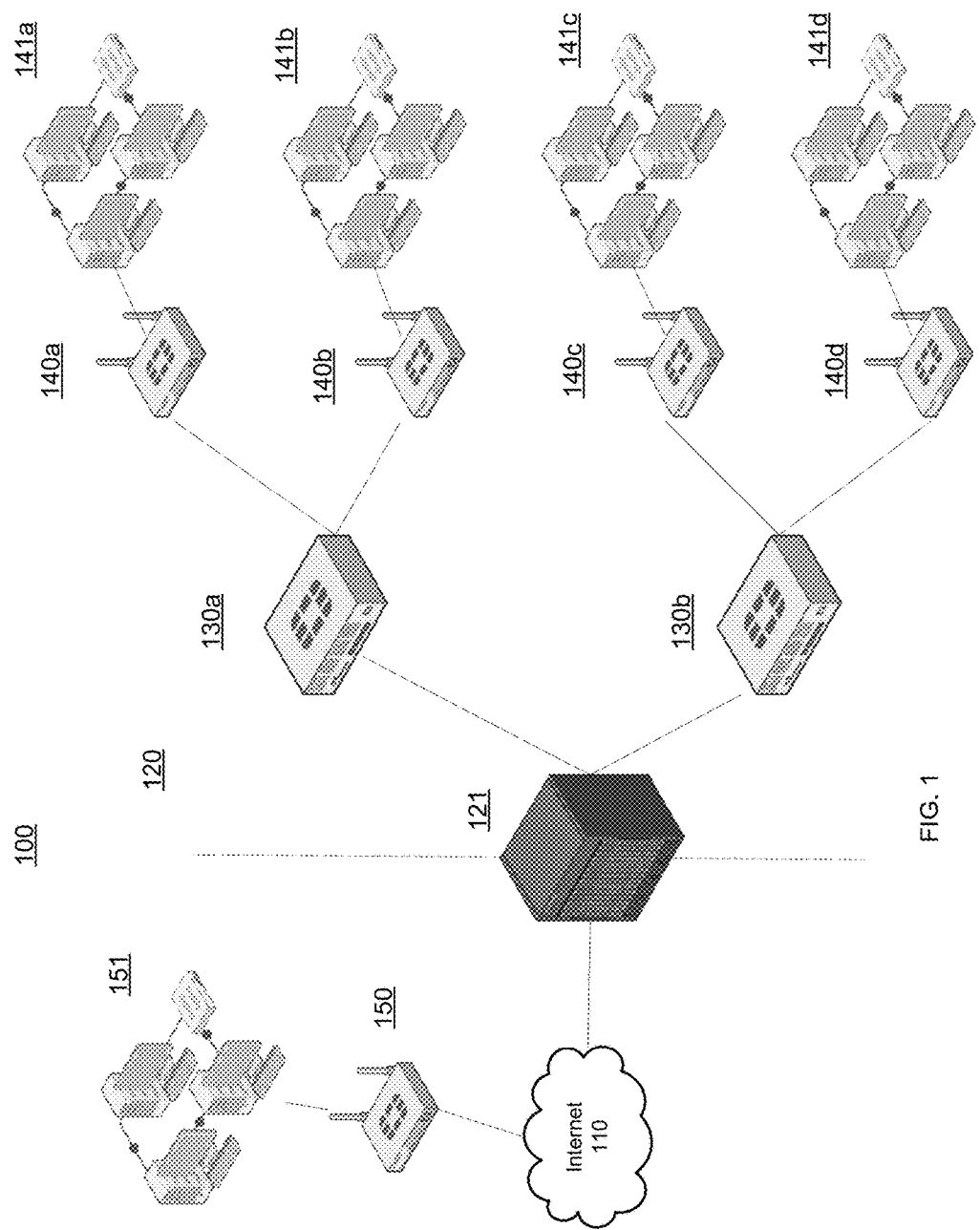
FIG. 1 illustrates an exemplary network architecture in accordance with an embodiment of the present invention.

Systems and methods for coordinating security operations among members of a cooperative security fabric (CSF) are provided. According to one embodiment, a first network security appliance of a CSF receives incoming network traffic and determines if the incoming network traffic is transmitted from a second network security appliance based on the source address of the network traffic. If the incoming network traffic is from the second network security appliance, the first network security appliance determines operations that are executed by the second network security appliance and then determines local operations. The first network security appliance applies local operations to the incoming network traffic.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be executed by hardware components or may be embodied in machine-executable instructions, which may be used to cause a general-purpose or special-purpose processor programmed with the instructions to execute the steps. Alternatively, the steps may be executed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to execute a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

FIG. 1 illustrates exemplary network architecture 100 in accordance with an embodiment of the present invention. In the context of the present example, network architecture 100 includes a private network 120 which is connected to the Internet 110. Private network 120 includes a root network security appliance 121, middle network security appliances 130a and 130b, subnet network security appliances 140a-140d and subnets 141a-141d. In this example, a subnet 151 and a subnet network security appliance 150 are connected to private network 120 through the Internet 110 via VPN.

Subnet 151 and subnet network security appliance 150 may be seen as a part of private network 110.

In this example, private network 120 may be a protected enterprise network of a corporation and subnets 141a-141d may be department networks that are used exclusively by different departments of the corporation. Each of subnets 141a-141d may comprise multiple computers and servers that are coupled to each other through a Local Area Network (LAN) or wireless LAN (WLAN).

Root network security appliance 121 separates the internal computing environment of private network 120 from the external computing environment, represented by Internet 110. Root network security appliance 121 may intercept communications between Internet 110 and the network appliances of private network 110 and may, among other things, scan for malware, viruses or high risk network accesses based on its network policies.

Each of subnets 141a-141d may connect to a subnet network security appliance 140a-140d, that separates a subnet from external computing environment. Subnet network security appliances 140a-140d may intercept communications transmitted from/to the subnets and may, among other things, scan for malware, viruses or high risk network accesses based on its network policies.

Similarly, middle network security appliances 130a and 130b that connect root network security appliance 121 and subnet network security appliances 140a-140d may also inspect network traffic between root network security appliance 121 and subnet network security appliances 140a-140d based on their respective local policies.

In the present example, downstream network traffic that is transmitted from the Internet 110 to a subnet 141 goes through three network security appliances, i.e. a root, a middle and a subnet network security appliance, while upstream network traffic that is transmitted from subnet 141 to the Internet 110 goes through a subnet, a middle and a root network security appliance. Each network security appliance on a network path has the ability to execute the same security operations based its local security policies. For example, each of the root, middle and subnet network security appliances may be configured with a local policy to log all the network traffic. In embodiments of the present invention, the root, middle and subnet network security appliances form a cooperative security fabric that coordinates operations among members and avoids redundant operations even when local policies define the same operations. The operations of a cooperative security fabric will be described below in reference with FIGS. 2, 3 and 4.

Figure 2:
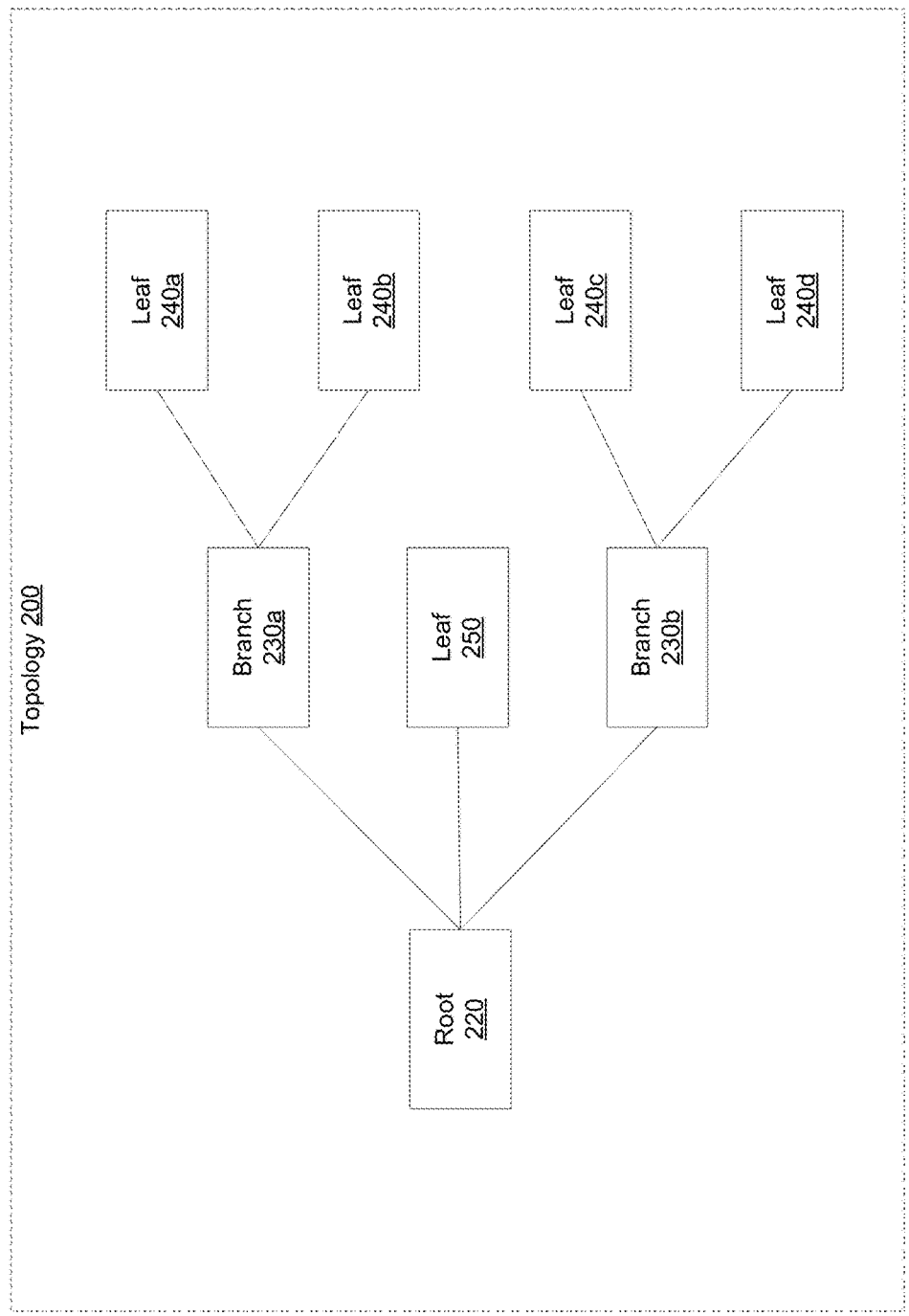
FIG. 2 is an exemplary topology of a cooperative security fabric (CSF) in accordance with an embodiment of the present invention.

FIG. 2 shows a topology 200 of a cooperative security fabric that consists of network security appliances of FIG. 1. In topology 200, a root node 220 corresponds to root network security appliance 121 which is the outermost network security appliance of the cooperative security fabric. Root node 220 acts as a WAN role in topology 200 that connects a private network to other networks or the Internet. Usually, a WAN port of root node 220 is connected to a public network and its LAN port connects to internal network appliances of the private network.

At a middle layer of topology 200, there are two branch nodes 230a and 230b correspond to middle network security appliances 130a and 130b. A branch node is a network security appliance that connects other network security appliances within the private network. For example, a WAN port of a branch node is connected to a LAN port of a root node and a LAN port of the branch node connect to a WAN port of a leaf node.

Leaf nodes 250a-250d are the network security appliances that are used for connecting endpoint devices of the private network. Endpoint devices are the sources or destinations of network traffic. Leaf nodes 250a-250d act as a LAN role in topology 200. Usually, a WAN port of a leaf node is connected to a LAN port of a branch or root node and LAN ports of leaf node are connected to endpoint devices, such as personal computers, servers, laptops, tablet computers, smart phones, printers and etc. For a cooperative security fabric, root nodes and leaf nodes are called edge nodes where network traffic is coming in or going out of the cooperative security fabric.

In FIG. 2, topology 200 includes only one root node and one layer of branch nodes. Those skilled in the art will appreciate that topology 200 may consist of other combinations of root, branch and leaf nodes. For example, topology 200 may include multiple root nodes that connect the private network to other networks. Topology 200 may have paths with no branch nodes, such as the network path in which a leaf node 250 is connected to root node 220 directly. Topology 200 may have multiple layers of branch nodes, i.e., multiple branch nodes exist between a root node and a leaf node. It is also possible that a node acts as a multiple roles in the topology 200. For example, if a network security appliance connects to another network security appliance as well as endpoint devices, the network security appliance is a branch node and a leaf node in the same time.

In order to cooperate among members of a cooperative security fabric, a member node of the cooperative security fabric may add one or more flags (e.g., a single bit flag or a collection of bit fields) to a network packet after the network packet is inspected by the member node. The network packet carrying the flag is transmitted to another member node at the next hop. When the network packet is received by a member node at the next hop, the member node may check if a flag is carried by the network packet. If the flag is founded, the member node may determine to skip the operations that have been reported via the flag(s) as having been executed by the last member node. In some examples, the flag may indicate the operations that have been executed by the member nodes. A member node may decide to execute or skip these operations based on the flag when network traffic is received from a member node.

Figure 3:
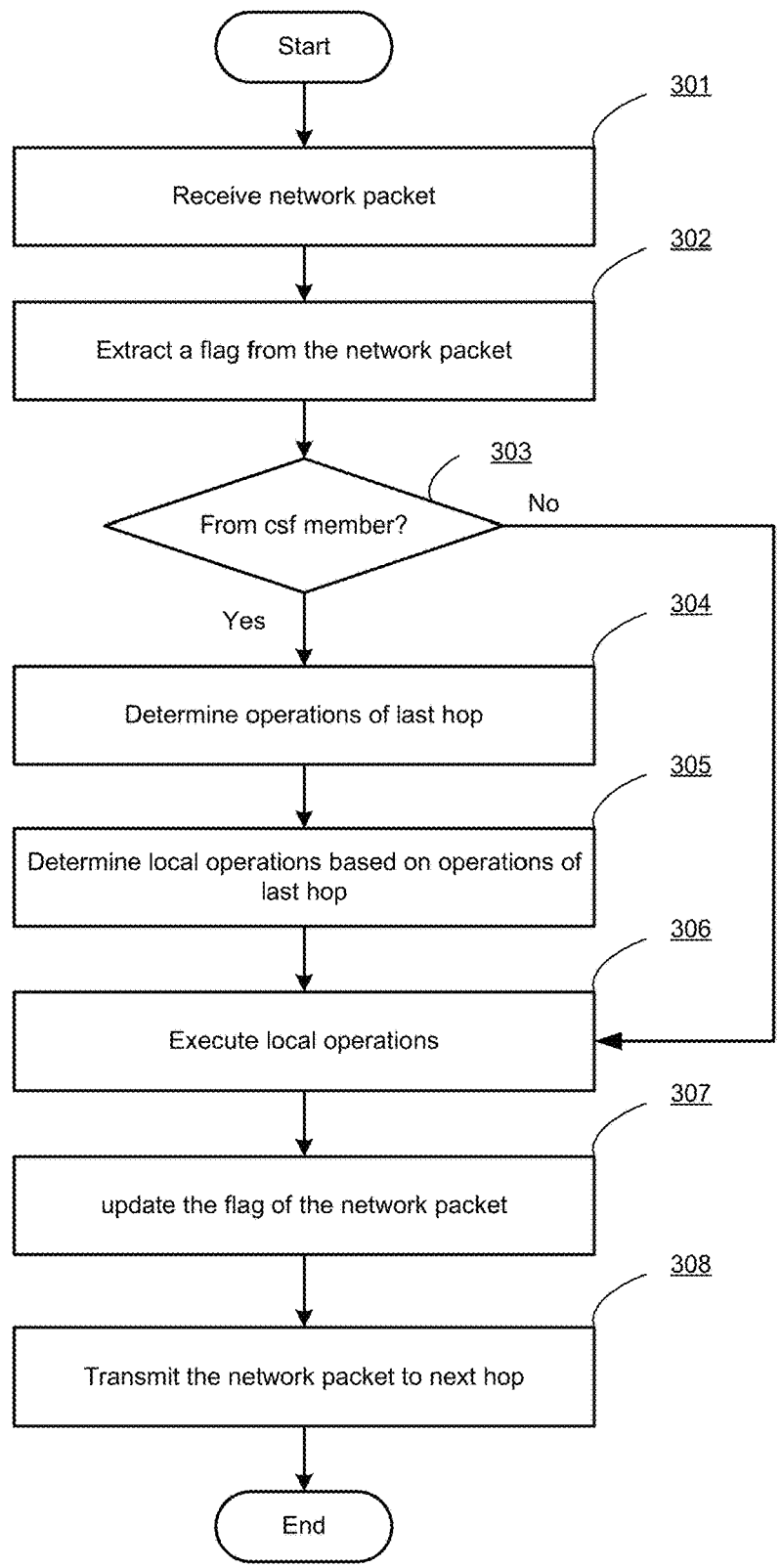
FIG. 3 is a flow diagram illustrating a method for inspecting network traffic by a member device of a cooperative security fabric in accordance with an embodiment of the present invention.

FIG. 3 is a flow diagram illustrating a method for inspecting network traffic by a member appliance of a cooperative security fabric (CSF) in accordance with an embodiment of the present invention. In this example, the CSF has a topology as shown in FIG. 2.

At block 301, a member node of a cooperative security fabric receives an incoming packet. The member node can be any node of the CSF, such as a root node, a branch node or a leaf node.

At block 302, the member node tries to extract a flag carried by the incoming packet. When the flag is present, it was added to the original network packet by a previous member node along the transmission path as an indicator to subsequent member nodes along the transmission path that, possibly among other things, the incoming packet was transmitted from the member node. The flag may be preferably added to the Internet Protocol (IP) options field of the original network packet, although other fields, such as type of service (TOS) field, may also be used. The member node may extract the flag that is set by the other member node from these fields of the incoming packet.

At block 303, the member node checks whether the incoming packet is from another member node of the CSF based on the flag carried by the incoming packet. In one example, the flag is set to indicate that the network packet is transmitted from a member node. In another example, the flag may include more information about the distribution of security operations among member nodes of a CSF. For example, a flag may be added to the first packet of a session only and no flag may be added to subsequent packets of the session. The flag in the first packet of the session may indicate that one or more network security operations (e.g., antivirus scanning, intrusion prevention (IPS), content filtering, data leak prevention (DLP), antispam, antispyware, reputation-based protections, event correlation, network access control, vulnerability management, load balancing, application control and traffic shaping) will be or have already been performed by the member node and that subsequent member nodes along the transmission path need not execute the same operation(s) again. In another example, a signature of the member node may be included in or accompany the flag and may be carried to other member nodes by the network packet. Other member nodes may extract the signature from the packet to authenticate that the flag carried by the network packet was actually transmitted from the member node. By checking the flag carried by the network packet, the local member node may determine that the network packet was transmitted from another member node of the CSF.

If a flag is not present in the incoming packet, it means that the member node is the first member of the CSF to receive the incoming packet. This may happen to root nodes for downstream network traffic and leaf nodes for upstream network traffic. The process goes to block 306 which will be described further below. If the incoming packet is from another member node, the process goes to block 304.

At block 304, the member node may determine what network security operations have been performed on the incoming packet by the member nodes at previous hops. In one example, the member node may assume that all security operations that the member nodes at previous hops are capable of executing have been performed when a flag associated with a member node is present within the incoming packet. In another example, the flag is added to each packet to indicate that one or more security operations have been executed by the flagging member node and other member nodes along the transmission path do not need to execute the same operation again. Further, each bit of the flag may correspond to a particular network security operation. A member node of the CSF may set a corresponding bit of the flag when a particular security operation will be or has been executed by it. For example, bit 0 of the flag may be used for traffic logging, bit 1 of the flag may be used for antivirus, bit 3 of the flag may be used for IPS and etc. If a member node is configured to execute logging and IPS, then bits 0 and 3 of the flag are set by the member node before transmitting the packet back onto the network. A member node may determine which security operations have been executed by previous member nodes along the transmission path by checking corresponding bits of the flag carried by the network packet.

At block 305, the member node determines local network security operations to perform on received network traffic based on operations of the member nodes at previous hops. In one example, the member node may skip one or more operations that have been executed at previous hops. For example, traffic logging may be executed only once at the first edge node based on a policy of a CSF. A logging flag may be set by the first edge member node after the first packet of a session is inspected by the first edge member node. All other member nodes along the transmission path may check the logging flag carried by the packet and do not execute the same logging operation so as to avoid redundancy. In another example, the member node may override CSF rules based on local policies, i.e., the local member node may determine to execute an operation despite the fact that the flag indicates that the operation has previously been executed by a previous member node (e.g., the previous hop member node) along the transmission path.

At block 306, the member node may execute the local network security operations determined based on local policies, skip those of the local network security operations that have been previously executed by a member node at a previous hop or override CSF rules to execute the local network security operations that have been previously executed at a previous hop.

At block 307, the member node may add a flag to the incoming packet according to the security operations that will be or have been executed by the member node. When the flag has been added by previous member nodes, the member node may update corresponding bits of the flag based on the local security operations that will be or have been executed by the member node. The member node may also add the signature of the member node to the flag in order that other member node may authenticate the flag. The member node may further detect if there is enough space to add the flag to the IP options field because many flags and signatures of previous member node may have previously been added to the IP options field. If not enough space is left in the IP options field, the member node may add/update a flag corresponding to the operations that are executed by the member to the IP options field and omit the signature. In another example, the flag is used exclusively within a cooperative security fabric to coordinate the operations among member nodes. When a network packet is to be transmitted out of the CSF, the flag may be removed from the network packet so as to hide the internal operations of the CSF. Therefore, an edge member node at the last hop of the CSF may remove the flag from the network packet before the network packet is transmitted out of the CSF.

At block 308, the member node transmits the incoming packet to a network appliance at next hop.

Figure 4:
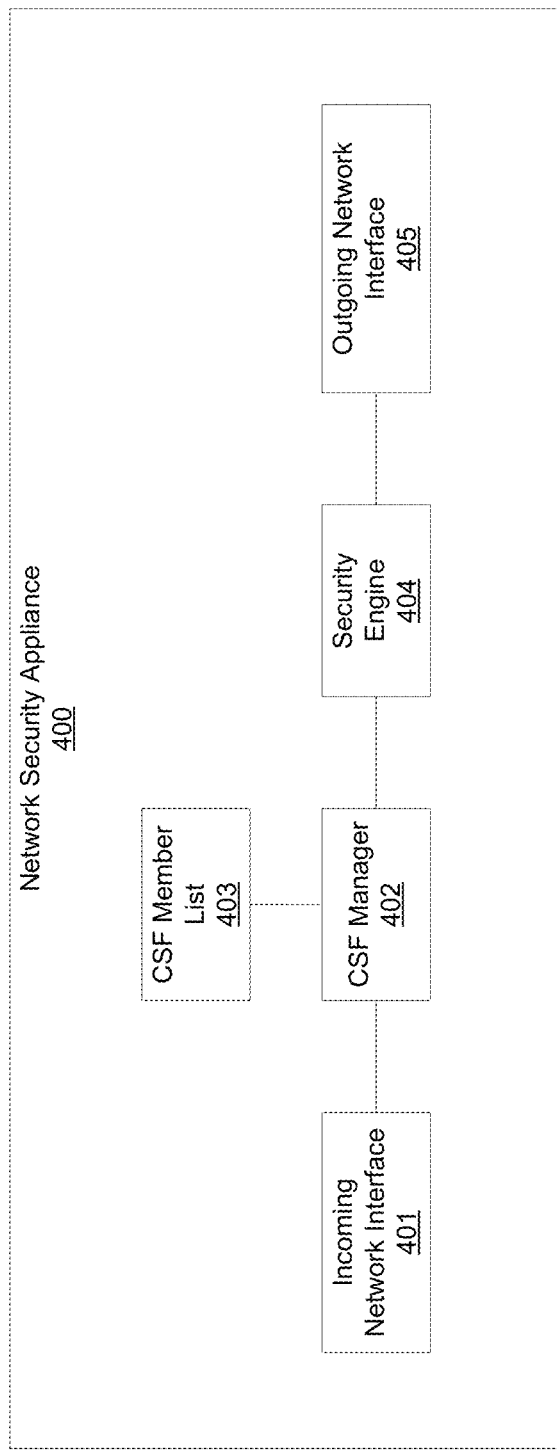
FIG. 4 is a block diagram illustrating functional units of a network security appliance that cooperates with other members of a cooperative security fabric in accordance with an embodiment of the present invention.

FIG. 4 is a block diagram illustrating functional units of a network security appliance 400 that cooperates with other members of a cooperative security fabric in accordance with an embodiment of the present invention. As shown in FIG. 4, network security appliance 400 can include an incoming network interface 401, a CSF manager 402, a CSF member list 403, a security engine 404 and an outgoing network interface 405.

CSF manager 402 is used for managing distribution of security operations among members of the CSF.

Incoming network interface 401 is used for receiving network traffic from other network appliances.

After network packet is received at incoming network interface 401, a flag indicating that the network packet has been transmitted from another member node of a CSF may be extracted from the network packet by CSF manager 402. The flag may have been added to the IP options field by a previous member node along the transmission path. If the flag is founded in the IP options field, CSF manager 402 may determine that the network traffic was transmitted from a member node of the CSF at a previous hop. CSF manager 402 may further determine what network security operations have been performed by the previous hop member node. CSF manager 402 may determine the network security operations by checking a bit in the flag that corresponds to the operation. The CSF manager 402 may further authenticate if the flag is from the member node it purports to be from based on a signature/token carried within or otherwise associated with the flag. The signatures/tokens of member nodes of a CSF may be synchronized through a tunnel between members.

After operations of member nodes at previous hops are determined, CSF manager 402 may further determine the local operations that are to be executed. For example, CSF manager 402 may determine that operations that are defined by local security policies should be executed at local the machine but skip the operations that have been performed or will be executed by previous member nodes based on the CSF rule. In this manner, the network security operations previously performed by other member nodes will not be repeated at the local machine. In another example, CSF manager 402 may determine to override the CSF rule based on a local rule, i.e., the operations previously performed by other member nodes will still be executed at the local machine.

Security engine 404 is used for executing security operations determined by CSF manager 402. Security engine 404 may inspect the network traffic to determine if the network traffic should be allowed or blocked. Other operations, such as antivirus, DLP, IPS, of security engine 404 are well known to those skilled in the art and further description thereof will be omitted.

Outgoing network interface 405 is used for transmitting the network traffic to next hop after the network packet is inspected by security engine 404. In one example, the flag indicating the local operations may be updated or added to the IP header of the network packet before it is transmitted to the next hop. In another examples, the flag may be removed from the network packet by an edge member node if the network packet is to be transmitted out of the CSF.

Figure 5:
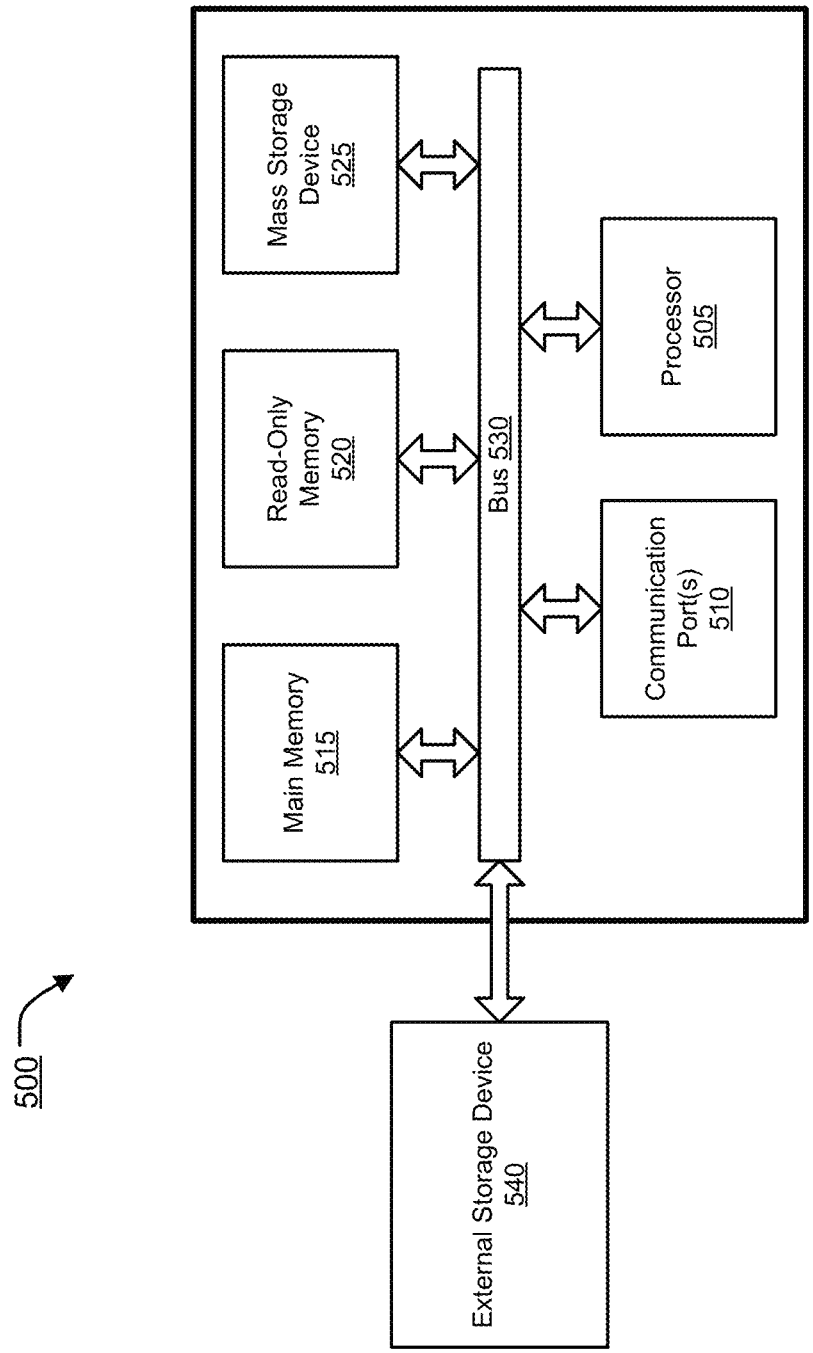
FIG. 5 is an exemplary computer system in which or with which embodiments of the present invention may be utilized.

FIG. 5 is an example of a computer system 500 with which embodiments of the present disclosure may be utilized. Computer system 500 may represent or form a part of a network security appliance (e.g., root network security appliance 121, middle network security appliance 130a or 130b, subnet network security appliance 140a-d, subnet network appliance 150 or network security appliance 400), a server or a client workstation.

Embodiments of the present disclosure include various steps, which have been described in detail above. A variety of these steps may be executed by hardware components or may be tangibly embodied on a computer-readable storage medium in the form of machine-executable instructions, which may be used to cause a general-purpose or special-purpose processor programmed with instructions to execute these steps. Alternatively, the steps may be executed by a combination of hardware, software, and/or firmware.

As shown, computer system 500 includes a bus 530, a processor 505, communication port 510, a main memory 515, a removable storage media 540, a read only memory 520 and a mass storage 525. A person skilled in the art will appreciate that computer system 500 may include more than one processor and communication ports.

Examples of processor 505 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 505 may include various modules associated with embodiments of the present invention.

Communication port 510 can be any of an RS-232 port for use with a modem based dialup connection, a 10/100 Ethernet port, a Gigabit or 10 Gigabit port using copper or fiber, a serial port, a parallel port, or other existing or future ports. Communication port 510 may be chosen depending on a network, such a Local Area Network (LAN), Wide Area Network (WAN), or any network to which computer system 500 connects.

Memory 515 can be Random Access Memory (RAM), or any other dynamic storage device commonly known in the art. Read only memory 520 can be any static storage device(s) such as, but not limited to, a Programmable Read Only Memory (PROM) chips for storing static information such as start-up or BIOS instructions for processor 505.

Mass storage 525 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 530 communicatively couples processor(s) 505 with the other memory, storage and communication blocks. Bus 530 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 505 to system memory.

Optionally, operator and administrative interfaces, such as a display, keyboard, and a cursor control device, may also be coupled to bus 530 to support direct operator interaction with computer system 500. Other operator and administrative interfaces can be provided through network connections connected through communication port 510.

Removable storage media 540 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
   receiving, by a first network security appliance of a private network that is participating in a cooperative security fabric (CSF), network traffic that is to be inspected by the first network security appliance;
   determining, by the first network security appliance, whether the network traffic has been transmitted from a second network security appliance that is participating in the CSF based on a flag carried by one or more packets of the network traffic;

when the network traffic is determined to have been transmitted from the second network security appliance:
  determining, by the first network security appliance, one or more network security operations that are executed by the second network security appliance;
  determining, by the first network security appliance, one or more local network security operations that are to be executed by the first network security appliance based on the one or more network security operations that are executed by the second network security appliance, including skipping, by the first network security appliance, the one or more network security operations that are executed by the second network security appliance; and
  executing, by the first network security appliance, the one or more local operations on the network traffic.

2. The method of claim 1, wherein said determining, by the first network security appliance, one or more network security operations of the first network security appliance to be executed by the first network security appliance based on the one or more network security operations that are executed by the second network security appliance further comprises determining, by the first network security appliance, one or more network security operations that are to be executed by the first network security appliance except the one or more network security operations that are executed by the second network security appliance based on local network polices.

3. The method of claim 1, wherein said determining, by the first network security appliance, one or more network security operations of the first network security appliance to be executed by the first network security appliance based on the one or more network security operations that are executed by the second network security appliance further comprises determining, by the first network security appliance, that the one or more network security operations that are executed by the second network security appliance are to be executed by the first network security appliance.

4. The method of claim 1, further comprising when the network traffic is not transmitted from the second network security appliance, executing, by the first network security appliance, one or more local network security operations specified by one or more local policies.

5. The method of claim 1, wherein the flag indicates the network security operations executed by the second network security appliance.

6. The method of claim 1, further comprising:
  updating, by the first network security appliance, the flag to indicate the network security operations executed by the first network security appliance; and
  transmitting, by the first network security network appliance, the network traffic with the updated flag to a next network appliance participating in the CSF.

7. The method of claim 1, further comprising:
  removing, by the first network security appliance, the flag from the network traffic; and
  transmitting, by the first network security network appliance, the network traffic without the flag to a next network appliance.

8. The method of claim 7, further comprising:
  determining, by the first network security appliance, whether the first network security appliance is an edge appliance of the private network; and
  when said determining is affirmative, then removing, by the first network security appliance, the flag from the network traffic.

9. The method of claim 7, further comprising:
  determining, by the first network security appliance, whether the first network security appliance is connected to an end point device; and
  when said determining is affirmative, then removing, by the first network security appliance, the flag from the network traffic before transmitting the network traffic to the end point device.

10. The method of claim 1, wherein the flag further comprises or is associated with a signature of the second network security appliance and wherein the method further comprises authenticating, by the first network security appliance, the second network security appliance based on the signature.

11. The method of claim 1, wherein the flag is carried in an Internet Protocol (IP) header field of the one or more packets.

12. The method of claim 1, wherein the one or more packets in which the flag is carried comprises a first packet of a session.

13. The method of claim 1, wherein the one or more network security operations include network traffic logging.

14. The method of claim 1, wherein the one or more network security operations include one or more of antivirus scanning, intrusion prevention (IPS), content filtering, data leak prevention, antispam, antispyware, reputation-based protections, event correlation, network access control, vulnerability management, load balancing, application control and traffic shaping.

15. A method comprising:
  receiving, by a first network security appliance of a private network that is participating in a cooperative security fabric (CSF), network traffic that is to be inspected by the first network security appliance;
  determining, by the first network security appliance, whether the network traffic has been transmitted from a second network security appliance that is participating in the CSF based on a flag carried by one or more packets of the network traffic;
  when the network traffic is determined to have been transmitted from the second network security appliance:
    determining, by the first network security appliance, one or more network security operations that are executed by the second network security appliance;
    determining, by the first network security appliance, one or more local network security operations that are to be executed by the first network security appliance based on the one or more network security operations that are executed by the second network security appliance, including determining one or more network security operations that are to be executed by the first network security appliance except the one or more network security operations that are executed by the second network security appliance based on local network polices; and
    executing, by the first network security appliance, the one or more local operations on the network traffic.

16. The method of claim 15, wherein the flag indicates the network security operations executed by the second network security appliance.

17. The method of claim 15, further comprising:
  updating, by the first network security appliance, the flag to indicate the network security operations executed by the first network security appliance; and transmitting, by the first network security network appliance, the network traffic with the updated flag to a next network appliance participating in the CSF.

18. The method of claim 15, further comprising:
removing, by the first network security appliance, the flag from the network traffic; and
transmitting, by the first network security network appliance, the network traffic without the flag to a next network appliance.

19. The method of claim 15, wherein the one or more network security operations include network traffic logging.

20. The method of claim 15, wherein the one or more network security operations include one or more of antivirus scanning, intrusion prevention (IPS), content filtering, data leak prevention, antispam, antispyware, reputation-based protections, event correlation, network access control, vulnerability management, load balancing, application control and traffic shaping.

21. A method comprising:
receiving, by a first network security appliance of a private network that is participating in a cooperative security fabric (CSF), network traffic that is to be inspected by the first network security appliance;
determining, by the first network security appliance, whether the network traffic has been transmitted from a second network security appliance that is participating in the CSF based on a flag carried by one or more packets of the network traffic;
when the network traffic is determined to have been transmitted from the second network security appliance:
 determining, by the first network security appliance, one or more network security operations that are executed by the second network security appliance;
 determining, by the first network security appliance, one or more local network security operations that are to be executed by the first network security appliance based on the one or more network security operations that are executed by the second network security appliance, including determining, by the first network security appliance, that the one or more network security operations that are executed by the second network security appliance are to be executed by the first network security appliance; and
 executing, by the first network security appliance, the one or more local operations on the network traffic.

22. The method of claim 21, wherein the flag indicates the network security operations executed by the second network security appliance.

23. The method of claim 21, further comprising:
updating, by the first network security appliance, the flag to indicate the network security operations executed by the first network security appliance; and
transmitting, by the first network security network appliance, the network traffic with the updated flag to a next network appliance participating in the CSF.

24. The method of claim 21, further comprising:
removing, by the first network security appliance, the flag from the network traffic; and
transmitting, by the first network security network appliance, the network traffic without the flag to a next network appliance.

25. The method of claim 21, wherein the one or more network security operations include network traffic logging.

26. The method of claim 21, wherein the one or more network security operations include one or more of antivirus scanning, intrusion prevention (IPS), content filtering, data leak prevention, antispam, antispyware, reputation-based protections, event correlation, network access control, vulnerability management, load balancing, application control and traffic shaping.

27. A method comprising:
receiving, by a first network security appliance of a private network that is participating in a cooperative security fabric (CSF), network traffic that is to be inspected by the first network security appliance;
determining, by the first network security appliance, whether the network traffic has been transmitted from a second network security appliance that is participating in the CSF based on a flag carried by one or more packets of the network traffic, wherein the flag indicates the network security operations executed by the second network security appliance;
when the network traffic is determined to have been transmitted from the second network security appliance:
 determining, by the first network security appliance, one or more network security operations that are executed by the second network security appliance;
 determining, by the first network security appliance, one or more local network security operations that are to be executed by the first network security appliance based on the one or more network security operations that are executed by the second network security appliance; and
 executing, by the first network security appliance, the one or more local operations on the network traffic.

28. The method of claim 27, further comprising:
updating, by the first network security appliance, the flag to indicate the network security operations executed by the first network security appliance; and
transmitting, by the first network security network appliance, the network traffic with the updated flag to a next network appliance participating in the CSF.

29. The method of claim 27, further comprising:
removing, by the first network security appliance, the flag from the network traffic; and
transmitting, by the first network security network appliance, the network traffic without the flag to a next network appliance.

30. The method of claim 27, wherein the one or more network security operations include network traffic logging.

31. The method of claim 27, wherein the one or more network security operations include one or more of antivirus scanning, intrusion prevention (IPS), content filtering, data leak prevention, antispam, antispyware, reputation-based protections, event correlation, network access control, vulnerability management, load balancing, application control and traffic shaping.

* * * * *

(12) INTER PARTES REVIEW CERTIFICATE (3885th)
United States Patent
Xu

(10) Number: US 10,084,825 K1
(45) Certificate Issued: Feb. 18, 2025

(54) REDUCING REDUNDANT OPERATIONS PERFORMED BY MEMBERS OF A COOPERATIVE SECURITY FABRIC

(71) Applicant: Xiaodong Xu

(72) Inventor: Xiaodong Xu

(73) Assignee: FORTINET, INC.

Trial Number:

IPR2023-00459 filed Jan. 31, 2023

Inter Partes Review Certificate for:

Patent No.: 10,084,825
Issued: Sep. 25, 2018
Appl. No.: 15/716,925
Filed: Sep. 27, 2017

The results of IPR2023-00459 are reflected in this inter partes review certificate under 35 U.S.C. 318(b).

INTER PARTES REVIEW CERTIFICATE
U.S. Patent 10,084,825 K1
Trial No. IPR2023-00459
Certificate Issued Feb. 18, 2025

AS A RESULT OF THE INTER PARTES REVIEW PROCEEDING, IT HAS BEEN DETERMINED THAT:

Claims 1-7 and 10-31 are cancelled.

* * * * *